(12) United States Patent
Maile et al.

(10) Patent No.: US 9,675,087 B2
(45) Date of Patent: Jun. 13, 2017

(54) FILLING MACHINE AND METHOD FOR MONITORING THE STATE OF FOULING IN A VACUUM SYSTEM OF A FILLING MACHINE

(71) Applicant: ALBERT HANDTMANN MASCHINENFABRIK GMBH & CO. KG, Biberach (DE)

(72) Inventors: Bernd Maile, Oggelshausen (DE); Claus-Peter Miller, Oberguenzburg (DE); Martin Staudenrausch, Biberach (DE); Guenter Sailer, Laupheim (DE); Marcel Nusser, Biberach (DE)

(73) Assignee: Albert Handtmann Maschinenfabrik GmbH & Co. KG, Biberach (DE)

( * ) Notice: Subject to any disclaimer, the term of this patent is extended or adjusted under 35 U.S.C. 154(b) by 0 days.

(21) Appl. No.: 15/099,484

(22) Filed: Apr. 14, 2016

(65) Prior Publication Data
US 2016/0302431 A1  Oct. 20, 2016

(30) Foreign Application Priority Data

Apr. 16, 2015 (EP) ..................................... 15163849

(51) Int. Cl.
*A22C 11/06* (2006.01)
*A22C 11/08* (2006.01)
(Continued)

(52) U.S. Cl.
CPC .............. *A22C 11/06* (2013.01); *A22C 11/08* (2013.01); *A23L 1/3175* (2013.01); *F04C 2/344* (2013.01); *F04C 13/00* (2013.01); *A23V 2002/00* (2013.01)

(58) Field of Classification Search
CPC ..... A22C 11/0245; A22C 11/06; A22C 11/02; A22C 7/00
USPC ... 452/21–26, 30–32, 35–35, 43, 46–48, 51; 418/15, 24, 31, 71, 127, 128, 255, 257, 418/258, 260
See application file for complete search history.

(56) References Cited

U.S. PATENT DOCUMENTS 3,658,446 A * 4/1972 Jansson ................. F04C 14/223
418/31
3,742,556 A * 7/1973 Beasley ................. A22C 11/08
452/41

(Continued)

FOREIGN PATENT DOCUMENTS

DE 19925417 C1 10/2000
EP 1044612 A1 10/2000
(Continued)

*Primary Examiner* — Richard Price, Jr.
(74) *Attorney, Agent, or Firm* — McCoy Russell LLP

(57) ABSTRACT

The invention relates to a filling machine for producing sausages and a method for monitoring the state of fouling of a collection container and/or a channel which is in communication with the collection container of such a filling machine, where the filling machine comprises a vane cell pump for delivering pasty mass, a vacuum pump for generating negative pressure of the vane cell pump, where the vane cell pump is via the collection container for the pasty mass that is dragged along in communication with the vacuum pump. The filling machine further comprises an inspection opening that is via a channel in communication with the collection container for inspecting the channel and/or the collection container.

29 Claims, 16 Drawing Sheets

(51) Int. Cl.
    *A23L 1/317*     (2006.01)
    *F04C 2/344*     (2006.01)
    *F04C 13/00*     (2006.01)

(56) References Cited

U.S. PATENT DOCUMENTS

| | | | | |
|---|---|---|---|---|
| 5,102,314 | A * | 4/1992 | Staudenrausch | A22C 11/08 418/127 |
| 5,129,316 | A * | 7/1992 | Calderon | B01F 7/16 366/139 |
| 5,720,603 | A * | 2/1998 | Miller | A22C 11/08 417/310 |
| 7,597,612 | B2 * | 10/2009 | Maile | F16K 1/36 452/30 |
| 7,744,448 | B2 * | 6/2010 | Maile | A22C 11/0245 452/31 |
| 8,678,885 | B2 * | 3/2014 | Staudenrausch | A22C 11/08 452/31 |
| 2014/0212558 | A1 | 7/2014 | Spierts et al. | |

FOREIGN PATENT DOCUMENTS

| | | | |
|---|---|---|---|
| EP | 1837524 | A1 | 9/2007 |
| EP | 2525098 | A1 | 11/2012 |
| EP | 2628391 | A1 | 8/2013 |

\* cited by examiner

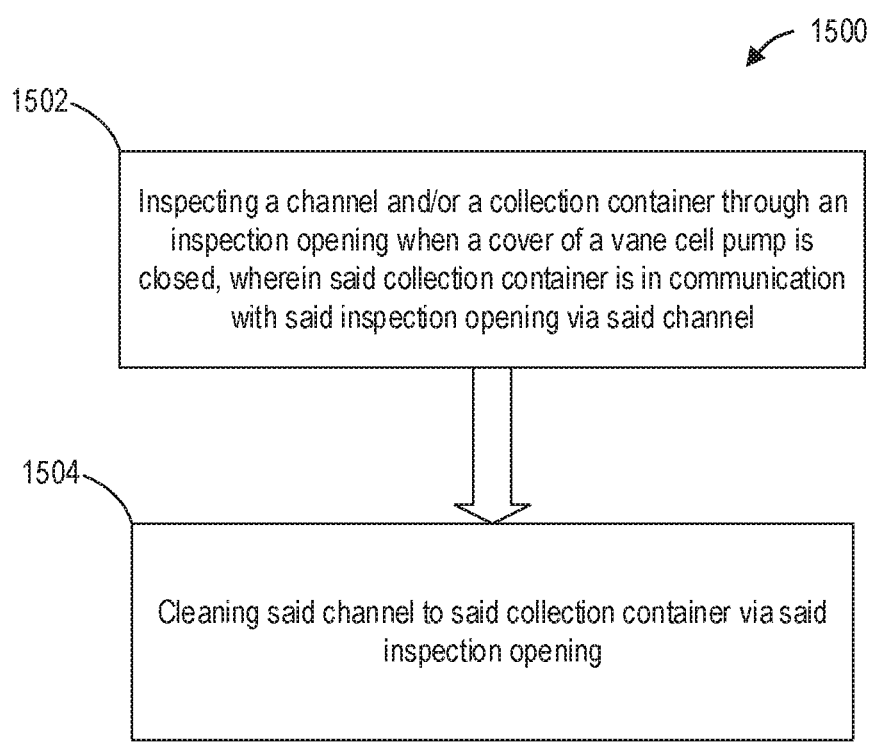

FILLING MACHINE AND METHOD FOR MONITORING THE STATE OF FOULING IN A VACUUM SYSTEM OF A FILLING MACHINE

CROSS REFERENCE TO RELATED APPLICATIONS

The present application claims priority to European Patent Application No. 15163849.1, entitled "FILLING MACHINE AND METHOD FOR MONITORING THE STATE OF FOULING IN A VACUUM SYSTEM OF A FILLING MACHINE," filed on Apr. 16, 2015, the entire contents of which are hereby incorporated by reference for all purposes.

TECHNICAL FIELD

The invention relates to a filling machine and a method for monitoring the state of fouling of a collection container and/or a channel, with which the collection container is in communication.

BACKGROUND AND SUMMARY

When producing sausages, a pasty mass is by use of a filling machine pushed via a hopper and a vane cell pump into a stuffing tube, where the pasty mass is then extruded, for example, from the stuffing tube into a sausage casing. In order to preserve food, in particular pasty mass such as sausage meat, as much air as possible is removed from these masses. A vacuum pump is for this purpose connected to the vane cell pump for the pasty mass in order to evacuate the vane cells of the vane cell pump. Respective filling machines or vane cell pumps are shown, for example, in EP 1 044 612 and EP 1 837 524. FIG. 10 shows a cross-sectional view through a respective vane cell pump. It is there evident that an evacuation opening is provided in the side wall of the vane cell pump and leads via a channel to the vacuum pump.

It happens when evacuating the delivery cells, however, that parts of the pasty mass are dragged along in the direction of the vacuum pump. A collection container is provided for this reason between the delivery pump and the vacuum pump to collect entrained pasty mass, dirt, and water. Also when cleaning the vane cell pump, parts of the conveyed mass, water, and dirt enter into this collection container. The vacuum pump and the air filter disposed upstream thereof can thereby be protected.

The collection container must be emptied and cleaned at regular intervals to prevent the spread of pathogenic organisms and unpleasant odors. It must additionally be prevented that the mass collected in the collection container exceeds a certain filling level, i.e. it must be prevented that the vacuum connection from the delivery pump to the vacuum pump is interrupted (for example, when the mass collected already completely fills the collection container and already rises into the vacuum lines so that the vacuum lines become clogged). Otherwise, there is an undesirable increase in pressure in the delivery cells. In addition, the vacuum channel between the conveying mechanism and the collection device must be cleaned regularly.

It is with conventional filling machines in the ready-to-operate state not possible to inspect the vacuum channel in order to decide at the right point in time whether the vacuum channel needs cleaning.

Accessibility to the vacuum channel was previously only possible from the upper side of the open conveying mechanism. This means that if e.g. a clogged vacuum channel needs to be cleaned, the hopper of the filling machine must first be emptied in order to then pivot upwardly the pivot casing to which the hopper is attached and at the lower end of which the cover of the vane cell pump is located. Any inspection of the vacuum channel is hardly feasible, and monitoring the collection container is cumbersome since, for example, the collection container is to be inspected behind a flap, while the vacuum must be switched off for inspection. Even with the vane cell pump being open, the vacuum channel and/or the collection container can not be adequately inspected.

Proceeding from there, the present invention is based on the object to inspect and clean the vacuum channel and/or the collection container in a simple manner.

The filling machine according to the invention for the production of sausages comprises a vane cell pump for delivering pasty mass, and a vacuum pump for generating negative pressure in the vane cells of the vane cell pump. The vane cell pump is via a collection container in communication with the vacuum pump. The collection container serves to collect pasty that is mass dragged along as well as fluids. The filling machine comprises an inspection opening in one example facing upwardly or obliquely upwardly which is via a channel in communication with the collection container for inspecting the channel and/or the collection container. This means that the inspection opening can be located in a horizontal plane but also in a plane which is inclined to the horizontal plane, for example, at an angle of 0°-45°, in particular 0°-15°.

This means that the inspection opening that can be freely inspected from above enables inspecting the channel and/or the collection container for fouling without the vane cell conveying mechanism or a flap to the collection container needing to be opened. From above presently means from a position above the vane cell pump or the machine housing, respectively. The degree of fouling of the channel and/or the collection container can thus be determined in a simple manner. Moreover, the inspection opening also provides access to the channel in order to clean the channel when necessary without complex measures being necessary.

Advantageously, the channel is in communication with an evacuation opening in the vane cell pump. This means that the channel is the vacuum channel via which the vane cells of the vane cell pump are evacuated or is at least a part of the vacuum channel or this vacuum connection, respectively. The inspection opening can be located either within the interior of the vane cell pump or, in one example, outside the interior of the vane cell pump.

The inspection opening is advantageously arranged outside the interior of the vane cell pump. The channel and/or the collection container can be freely inspected from a position above the closed cover of the vane cell pump through the inspection opening.

This means that the vane cell pump does not need to be opened when inspecting for fouling, so that, for example, a cover of the vane cell pump together with a pivot housing and a hopper disposed thereon do not need to be pivoted away. An important advantage is also the fact that the channel and/or the collection container can be inspected and cleaned without requiring the hopper to be emptied for this.

According to another embodiment of the present invention, the inspection opening is disposed, for example, in a cover of the vane cell pump. In this case, the pivot housing on which the vacuum hopper is disposed and on the underside of which the cover is attached is in certain types of machines smaller than the cover, such that the cover protrudes beyond the pivot housing. But it is also possible that the inspection opening is located in the pivot housing, and a recess then extends from the inspection opening through the pivot housing and the cover to the channel. It is alternatively also possible that the inspection opening is located in the machine housing, i.e. in the surface of the filling machine laterally adjacent to the cover and the pivot housing. The aforementioned embodiments enable the channel and/or the collection container to be inspectable through the inspection opening when the cover is advantageously closed.

Free inspectability is advantageously given from the inspection opening through the channel up to the collection container.

The channel is there formed substantially straight, the channel in particular runs at an angle of 0° to 45°, in one example, 0° to 45° to a vertical longitudinal axis of the filling machine. "Substantially straight" is in this application to mean that the channel is either straight or the curvature or angulation of the channel is so small that the inlet to the collection container can at least partially be recognized from the inspection opening, i.e. that there is at least one straight optical path connecting the inspection opening with the inlet to the collection container. The operator can therefore easily see through the channel up to the collection container.

According to another embodiment, the evacuation opening is located in the pump cover. The evacuation opening has previously been located principally in the side wall of the pump housing. Due to a radial sealing gap between the vane and the vane cell pump housing, pasty mass is dragged along by the rotor and the pump vanes into the evacuation region, i.e. the region in which the evacuation opening is disposed. This dragged along material then deposits on the lateral pump wall in the evacuation region and over time clogs the evacuation opening in the pump wall. Moreover, pasty mass is dragged along into the channel and the collection container. Consequently, the evacuation and thereby the portioning accuracy also deteriorates. According to the present invention, the evacuation opening is now located in the pump cover, i.e. suction is effected upwardly and the vane cells are vented upwardly, respectively, where suction is effected through the pump cover. Whenever a pump vane passes by beneath the evacuation opening, the pasty mass, should something have nevertheless been deposited at the pump cover, is entrained by the pump vanes and the bore hole is thereby kept clear. Keeping the evacuation opening clear at the pump cover is possible for the reason that the gap between the pump vane and the pump cover is considerably smaller than the radial gap between the pump wall and the pump vane. Clogging of the evacuation bore by sausage meat that is dragged along is thereby prevented.

The inspection opening is configured as being closable. The inspection opening can by way of a closure element be closed and also be reopened. The closure element may be configured as an axially movable piston. The closure element can also comprise an inspection glass so that the operator can inspect the channel and/or the collection container also during an ongoing process through the inspection glass and immediately become aware of excessive fouling.

According to another embodiment, the inspection opening is disposed in the upper region of a recess. This recess can be arranged, for example, in the cover of the vane cell pump and/or of the pivot housing or of the machine housing. The recess is open through the inspection opening toward the top and comprises a circumferential side wall and an adjoining lower base region. The channel in one example opens into the lower region of the recess, so that the inspection opening is via the recess in communication with the channel. A further channel section being in communication with the evacuation opening in the vane cell pump in one example advantageously opens into the lower region of the recess. The vane cell pump is therefore via the evacuation opening, the further channel section, the recess and the channel in communication with the collection container.

If also the further channel section is in communication with the lower region of the recess, then the advantage arises that also the channel section and the evacuation opening are inspectable from above through the inspection opening. The entire region from the evacuation opening up to the channel and, in one example, up to the collection container can therefore be inspected when the conveying mechanism is open.

The piston is advantageously arranged to be axially movable in the recess such that in a lower position, it closes either the channel which is in communication with the collection container and/or the further channel section, i.e. separates the channel from the further channel section.

The axially movable piston can also be completely removed from the recess, so that, for example, the channel can be better inspected and cleaned. It is also possible to move the axially movable piston so far upwards that the channel and the further channel section can be vented. In the inserted state, the piston seals the recess from the exterior. The piston can be axially moved manually, for example, by use of a thread, a bayonet closure, etc.

However, it is also possible to provide a driven closure cylinder which separates the vacuum connection between the vacuum pump and the vane cell pump, where the closure cylinder can be retracted—when viewed from a position in the vertical direction—in one example, below the cover into the channel.

According to one embodiment, at least one sensor is integrated in the closure element and/or into the cover of the vane cell pump, in particular for measuring the temperature and/or the pressure or the density or of the air content etc. An optical sensor can also be integrated in the closure element and optically detect, for example, the channel and/or the collection container and illustrate this on a display. According to one embodiment, also the further channel section and optionally the evacuation opening can be optically detected by this sensor. The sensor signals can be supplied to the controller of the filling machine and evaluated there, and thereby be used for automated process control and optimization.

The channel is advantageously formed at least in sections from transparent material, e.g. as a transparent hose which is attached to the recess. Also the collection container is at least in part formed from transparent material in one example. At least one illumination device (for example, an LED lamp) can be provided for illuminating the channel and/or of the collection container, to illuminate the channel and/or the collection container from the outside. If the channel and/or the collection container are illuminated from the outside, then any fouling can be particularly well detected and recognized and a gap-free structure is created.

According to the method of the invention for monitoring the state of fouling of a collection container and/or of a channel via which the collection container is in communication with the inspection opening, a filling machine may be inspected through an inspection opening of the channel, and/or the collection container when the cover of a vane cell pump is closed. The inspection opening may be opened upwardly (or obliquely upwardly) in one example.

When it is determined that the channel is fouled too much, the channel can be cleaned through the inspection opening. When it is detected via the inspection opening that the collection container is too full, then the collection container can at the same time be emptied.

According to one embodiment, also the evacuation opening and/or the channel section which communicates with the evacuation opening can be inspected and cleaned through the inspection opening. This means that the inspection opening is disposed relative to the evacuation opening and/or to the channel section such that free inspectability is ensured from above. This also means that a straight optical path exists which connects the inspection opening with the evacuation opening or the channel section which is in communication with the evacuation opening.

BRIEF DESCRIPTION OF THE FIGURES

The invention shall be explained below in more detail with reference to the following figures.

FIG. 15 is a flow chart of an example method according to the present invention.

DETAILED DESCRIPTION

FIGS. 1-14 show the relative positioning of various components of the filling machine. If shown directly contacting each other, or directly coupled, then such components may be referred to as directly contacting or directly coupled, respectively, at least in one example. Similarly, components shown contiguous or adjacent to one another may be contiguous or adjacent to each other, respectively, at least in one example. As an example, components lying in face-sharing contact with each other may be referred to as in face-sharing contact or physically contacting one another. As another example, elements positioned apart from each other with only a space there-between and no other components may be referred to as such, in at least one example.

As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 1:
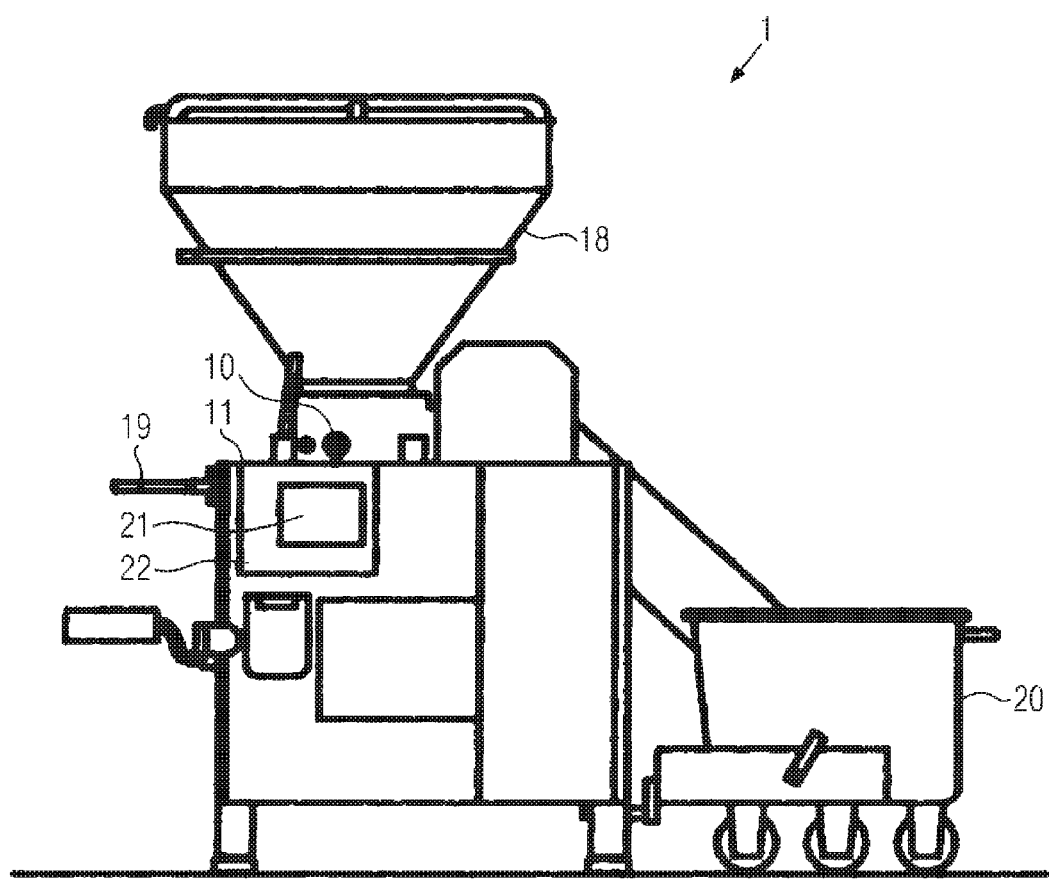
FIG. 1 very schematically shows a side view of a filling machine according to one embodiment of the present invention.
Figure 2:
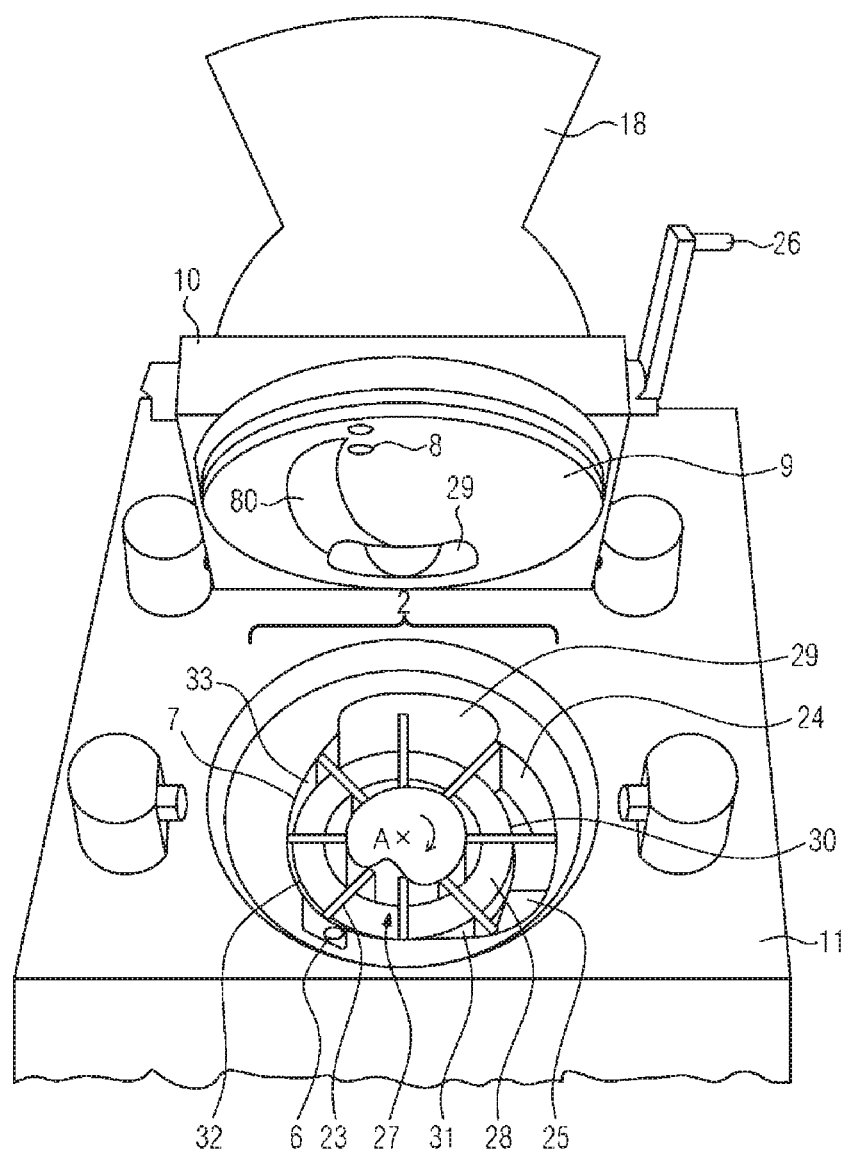
FIG. 2 schematically shows a vane cell pump in a perspective view.

FIG. 1 very schematically shows a side view of a filling machine according to the present invention. Filling machine 1 comprises a hopper 18 for receiving a pasty mass. This hopper 18, as is apparent also from FIG. 2, is arranged on a pivot housing 10 such that the pivot housing including a cover 9 of a vane cell pump 2 can be pivoted for opening vane cell pump 2. Vane cell pump 2 is disposed below the hopper. Filling machine 1 further comprises a stuffing tube 19. The pasty mass is pushed through vane cell pump 2 into stuffing tube 19 and then extruded in a known manner, for example, into sausage casings. The filling machine further comprises a controller 22 and a display 21. In this embodiment, the filling machine further comprises a lifting device with a lifting carriage 20 with which the pasty mass can be raised and dumped into hopper 18. The filling machine comprises a machine housing 11 in which vane cell pump 2 is arranged.

FIG. 2 shows the structure of vane cell pump 2 in greater detail. The vane cell pump comprises a lateral housing wall 24 and a base plate 25 and can with cover 9 be closed toward the top. In the position illustrated in FIG. 2, the vane cell pump is open, for example, for cleaning purposes, so that the interior of the conveying mechanism can be seen.

For closing, the cover, being pivotable about an axis of rotation attached to the machine housing upper side, can by use of lever 26 be pivoted downwardly to the operating position. Provided in interior 27 is an eccentrically disposed rotor 28 that can be made to rotate. Located in rotor 28 are radially slidable vanes 23 which with housing wall 24 of the vane cell pump, base 25 and cover 9, and the outer surface of rotor 28 form vane cells and cooperate in a sealing manner. Additionally, a groove-shaped depression 80 can be provided in the downwardly facing surface of cover 9.

The vane cell pump further comprises a sausage meat inlet 29 and a sausage meat outlet 31. Sausage meat inlet 29 is in the direction of rotation A followed by a pressure region 30 in which vane cells 7 become smaller in volume. This pressure region opens into sausage meat outlet 31 which leads to a discharge pipe, not shown. The sausage meat outlet is in the direction of rotation A followed by a sealing region 32 in which the outer surface of rotor 28 directly contacts the inner wall of the pump housing.

The sealing region is followed by the vacuum or suction region 33 which reaches all the way to sausage meat inlet 29. Negative pressure is generated in this vacuum or suction region and facilitates filling in the pasty mass and serves withdrawing as much air as possible from the pasty mass. For evacuating vane cells 7 in this vacuum region 33 (see also FIG. 14), an evacuation opening 8 is provided via which vane cells 7 can with the aid of a vacuum pump 3, as for example shown in FIG. 3, be evacuated, this means e.g. the pressure in the vane cells is reduced.

Figure 3:
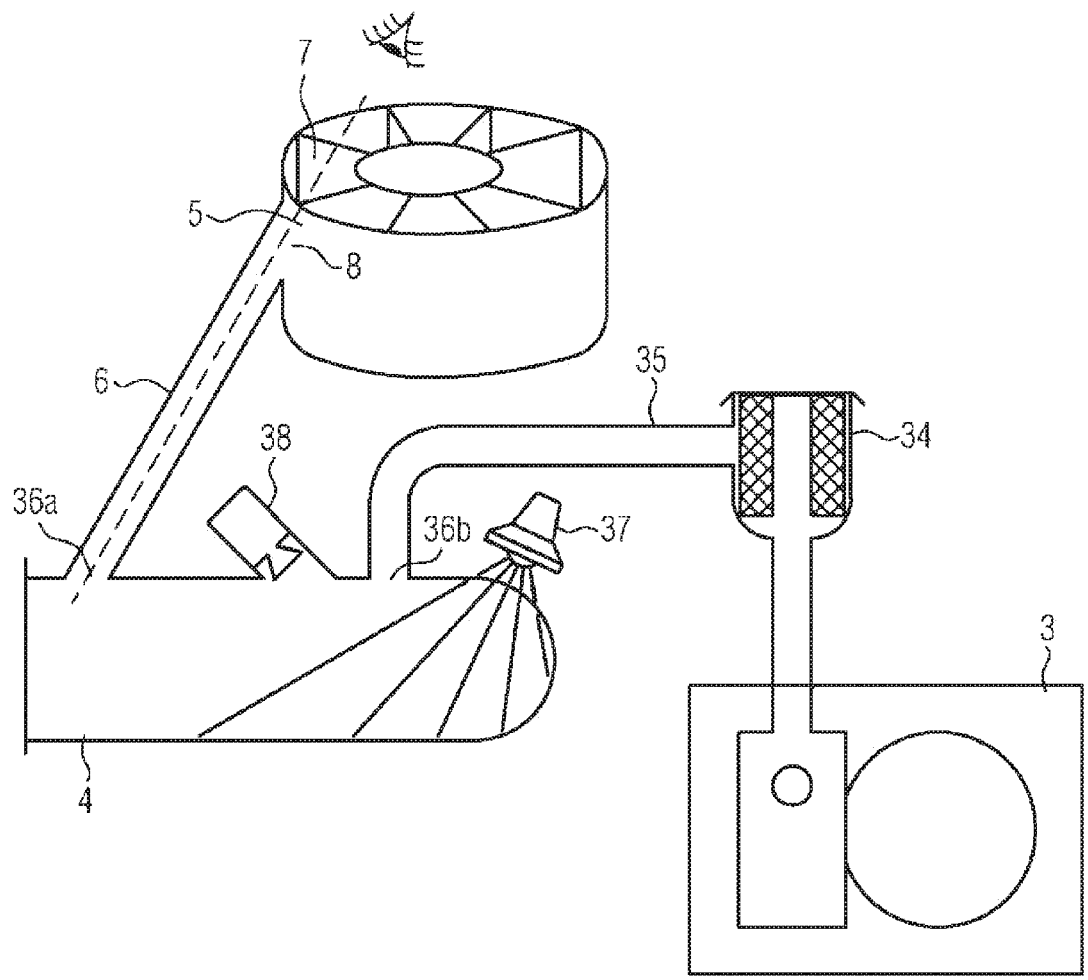
FIG. 3 very schematically shows a first embodiment of the present invention.

In the embodiment shown in FIG. 3, evacuation opening 8 is arranged in side wall 24 of vane cell pump 2. In the embodiment shown in FIG. 3, open cover 9 is for reasons of simplicity not illustrated. A channel 6 is in communication with evacuation opening 8 and opens into a collection container 4 for pasty mass that is dragged along. Dragged along pasty mass, dirt and water can be collected in the collection container. Also when cleaning the vane cell pump, parts of the conveyed mass enter into this collection container. Vacuum pump 3 and an optionally provided air filter 34, which is connected via a line 35 to collection container 4, can thereby be effectively protected.

The filling level in collection container 4 may not rise too high such that openings 36a and 36b to channel 6 or to line 35 to the air filter are clogged, as no vacuum can be otherwise be generated in vane cells 7. Moreover, channel 6 may also not severely foul or clog, so as to ensure that sufficient vacuum is generated. Inspection of the fouling of channel 6 was previously cumbersome. Inspection of the filling level or the degree of fouling of collection container 4 was possible only by switching off the vacuum at the machine and by opening a cover flap of the collection container at machine housing 11.

An inspection opening 5 is now according to one embodiment of the present invention provided which is via a channel 6 in communication with collection container 4 for inspecting the channel and/or the collection container. As is demonstrated by the eye in FIG. 3, the interior of channel 6 can be inspected through inspection opening 5, where inspectability is given through the channel all the way to collection container 4. It can therefore be recognized in a simple manner whether any fouling in channel 6 is given, and whether channel 6 is clogged, or whether collection container 4 is too full. In order to ensure inspectability, the channel should branch off substantially straight from side wall 24 of vane cell pump 2, in particular at an angle of 0° to 15°, to the vertical longitudinal axis of the filling machine. "Substantially straight" is in this application to mean that the channel is either straight or the curvature or deviation from a straight course of the channel is so small that inlet 36a of the collection container can at least partially be recognized from inspection opening 5, i.e. that there is at least one straight optical path connecting the inspection opening with inlet 36a to the collection container, as is evident in particular from FIG. 13. The operator can therefore easily see through the channel up to the collection container. In this embodiment, the inspection opening is—when viewed in the vertical direction—advantageously located in the upper half or in the upper third of side wall 24, respectively, in order to ensure good inspectability.

It is particularly advantageous to have channel 6 be formed at least in sections from transparent material, e.g. as a transparent hose and/or the collecting container is formed at least in sections from transparent material such that light can shine from the outside through the material. At least one illumination device 37, e.g. in the form of an LED lamp, can for this purpose illuminate channel 6 and/or collection container 4 from the outside. If channel 6 and/or collection container 4 are illuminated from the outside, then any fouling can be detected and recognized particularly well. If, for example, channel 6 is clogged, then a dark spot appears. A camera 38 can additionally be disposed (for example in a recess in a position above the maximum filling level in collection container 4) to capture the interior of collection container 4 and display it, for example, on a display, e.g. display 21. This enables an additional monitoring option. The illumination device is for example an LED lamp.

In the embodiment shown in FIG. 3, inspection opening 5 is arranged in side wall 24 of vane cell pump 2. This entails the drawback that cover 9 of the vane cell pump must be opened for inspecting and cleaning channel 6. The following embodiments essentially correspond to the embodiment shown in FIG. 3, except that the inspection opening is not located in the interior of vane cell pump 2 but outside the vane cell pump and facing outwardly, in one example, upwardly.

Figure 4:
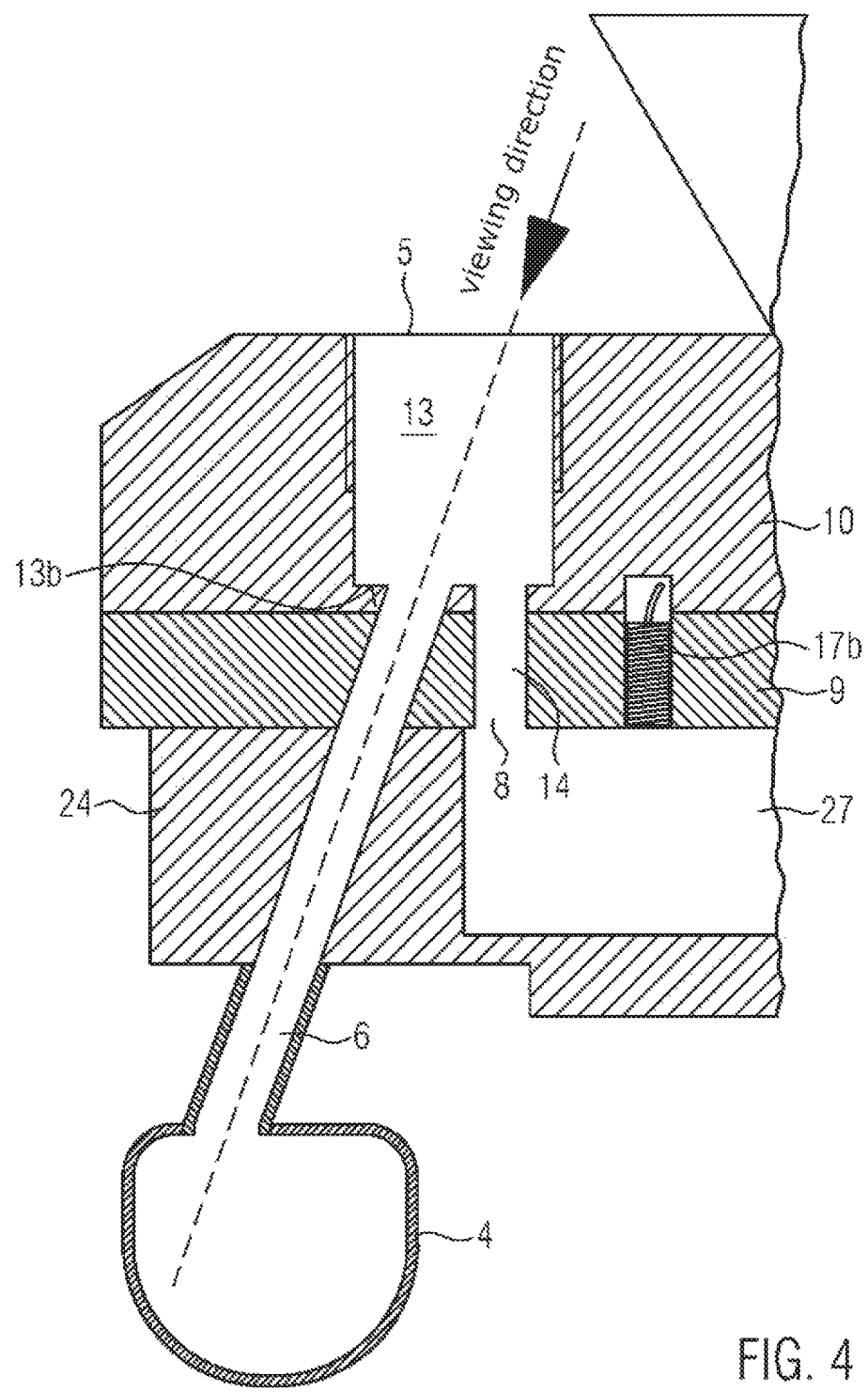
FIG. 4 very schematically shows a sectional view through a part of the filling machine according to a second embodiment of the present invention.

FIG. 4 shows a corresponding partial longitudinal sectional view of a filling machine according to such an embodiment. 27 schematically indicates the chamber or the interior of the vane cell pump which is there closed by cover 9. Pivot housing 10 is arranged above cover 10. Upwardly facing inspection opening 5 is there provided in pivot housing 10. Inspection opening 5 is there provided in the upper region of a recess 13 formed in pivot housing 10. Recess 13 could also extend into cover 9. Channel 6 there extends from water separator 4 through housing wall 24 of the vane cell pump, the cover 9, and opens into lower region 13b of recess 13. Recess 13 can be formed, for example, as a hollow cylinder, but is not restricted to this shape.

Evacuation opening 8 is there not provided in side wall 24, but in cover 9. A further channel section 14 extends from evacuation opening 8 to recess 13 and also opens into the latter's lower region. According to the present invention, evacuation opening 8 is now located in pump cover 9, i.e. suction is effected upwardly and the vane cells are vented upwardly, respectively, where suction is effected through pump cover 9. Whenever a vane 23 passes by beneath evacuation opening 8, the pasty mass, should there have nevertheless been some deposit at the pump cover, is entrained by the pump vane and the bore hole is thereby kept clear. Keeping evacuation opening 8 clear at the pump cover is possible for the reason that the gap between pump vane 23 and pump cover 9 is considerably smaller than the radial gap between the pump wall and the pump vane in solutions where evacuation opening 8 is located in the lateral region. Clogging of the evacuation bore by sausage meat that is dragged along is thereby effectively prevented.

Channel 6 is therefore via recess 13 and section 14 in communication with the vane cell, i.e. evacuation opening 8. As can be seen by the arrow in FIG. 4 indicating the viewing direction, the interior of channel 6 and also of collection container 4 can be inspected via inspection opening 5. The operator can therefore inspect the degree of fouling in a simple manner from above, i.e. from a position above cover 9 and above pivot housing 10, without the cover or cover 9, respectively, and pivot housing 10 needing to be flipped open. Cleaning channel 6 is also possible—for example with a brush and/or liquid detergent, without having to open cover 9, so that it is then also not necessary to empty the hopper. Evacuation opening 8 and channel section 14 are advantageously arranged such that this region can as well be inspected through inspection opening 5 without the need for opening the vane cell pump. It would also be possible that channel 6 and/or channel section 14 do not open into the lower region, i.e. the base, but laterally into the recess at an angle such that a view is possible from the inspection opening into channel 6 up to the collection container and/or into channel section 14 up to the evacuation opening.

Inspection opening 5 is advantageously formed to be closeable. The inspection opening can be closed by way of a closure element 12, as is apparent in particular from FIG. 5, which describes a further embodiment of the present invention that corresponds substantially to the embodiment shown in FIG. 4. The closure element is there embodied as an axially movable piston 12. The axially movable closure piston is configured as a vacuum closure and there closes inspection opening 5. Axially movable piston 12 can be moved, for example, up and down manually in the recess, in particular by a thread.

Figure 5:
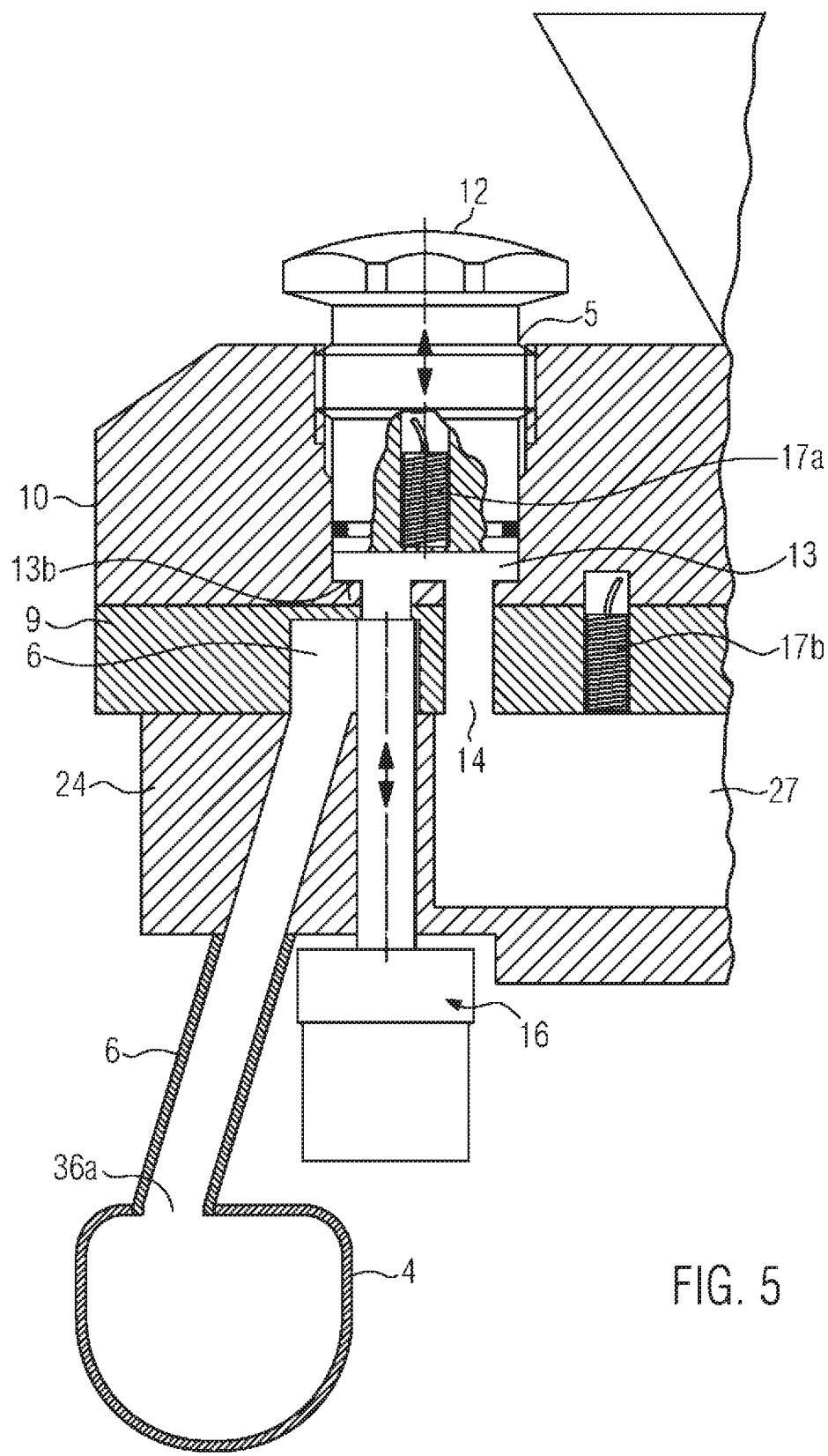
FIG. 5 shows a longitudinal sectional view through a part of a filling machine according to a third embodiment of the present invention in the evacuation position.

When piston 12 shown in FIG. 5 is moved still further downwardly to its lowermost position, it can close either channel 6 and/or further channel section 14, both of which open into recess 13, i.e., separate channel 6 from further channel section 14. In addition, a closure cylinder 16 is there provided which separates channel 6 from evacuation opening 8 such that there is no longer any vacuum connection between the vacuum pump and the conveying mechanism. Closure cylinder 16 is there located in the lower region of cover 9. A respective closure, however, can also be effected from the top or from the side. Actuation of the closure cylinder can be effected electrically, pneumatically or hydraulically. It is only essential that the closure cylinder closes channel 6.

At least one sensor 17a can be provided in the closure element, presently closure piston 12, for measuring the pressure or the temperature or the filling level. Such a sensor, or such sensors 17b, can additionally or alternatively also be disposed in pump cover 9 or in the vacuum or suction region of the vane cell pump. The respective sensor signals can be supplied to controller 22 of the filling machine and evaluated and used there for automated process control and optimization.

A respective pressure sensor 17a, which is easy to disassemble and clean, can effectively monitor the operation of the evacuation system between vacuum pump 3 and the closure piston. Sensor 17b is able to monitor the actual pressure conditions in the vacuum region of the vane cell pump. When both sensors 17a, 17b are used, providing detailed information about potential errors (e.g. closure of vacuum channels) in the evacuation system is possible.

If, for example, the pressure measured by sensor 17a differs from a set point value, then this is also an indication that fouling has occurred and cleaning is necessary.

Figure 6:
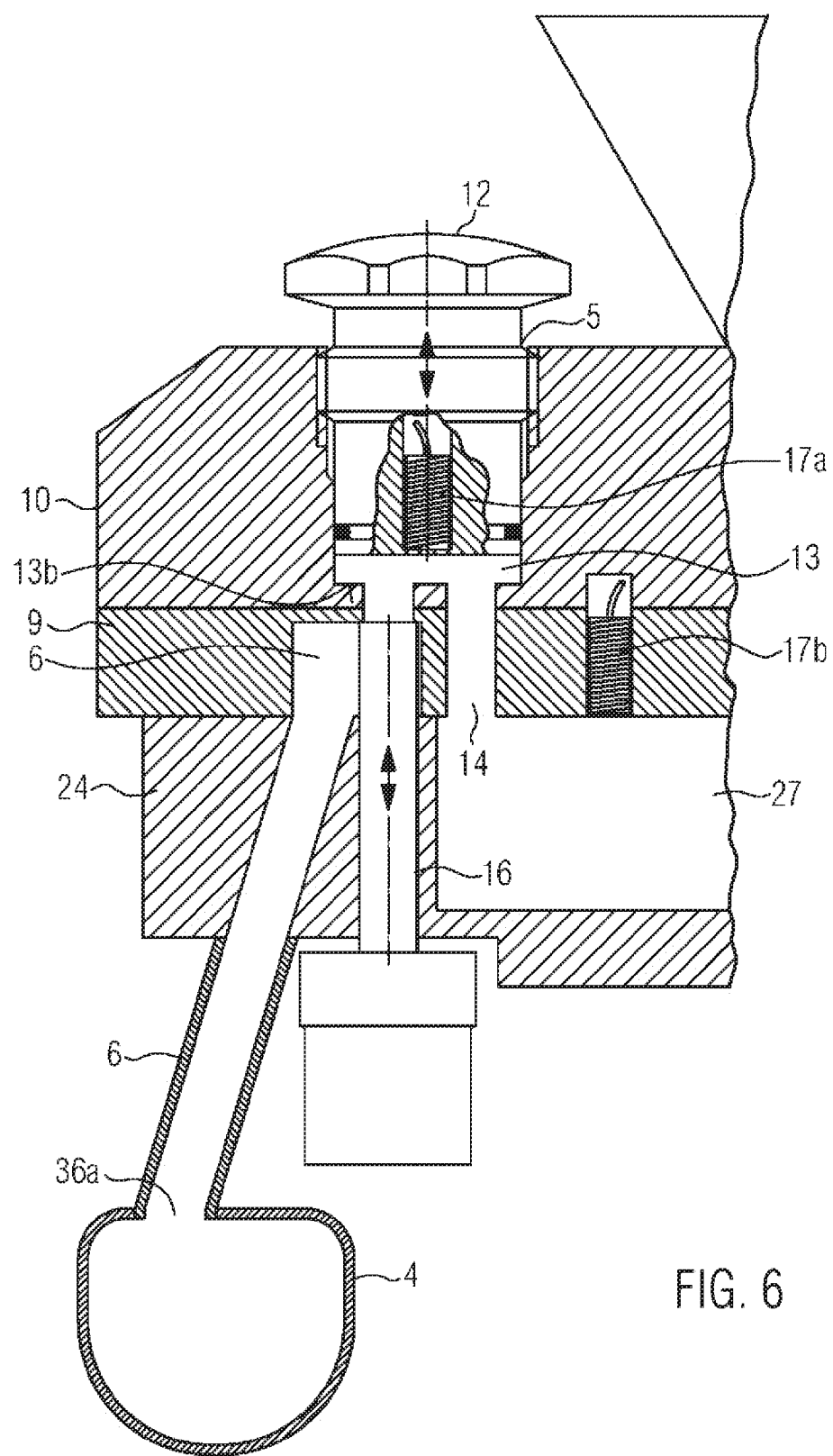
FIG. 6 shows the embodiment shown in FIG. 5 with the closure cylinder being closed.

FIG. 6 shows the embodiment shown in FIG. 5 with the closure cylinder being closed. Closure cylinder 16 is there located in its upper position so that the vacuum connection between the collection container and the vane cell pump is closed.

Figure 7:
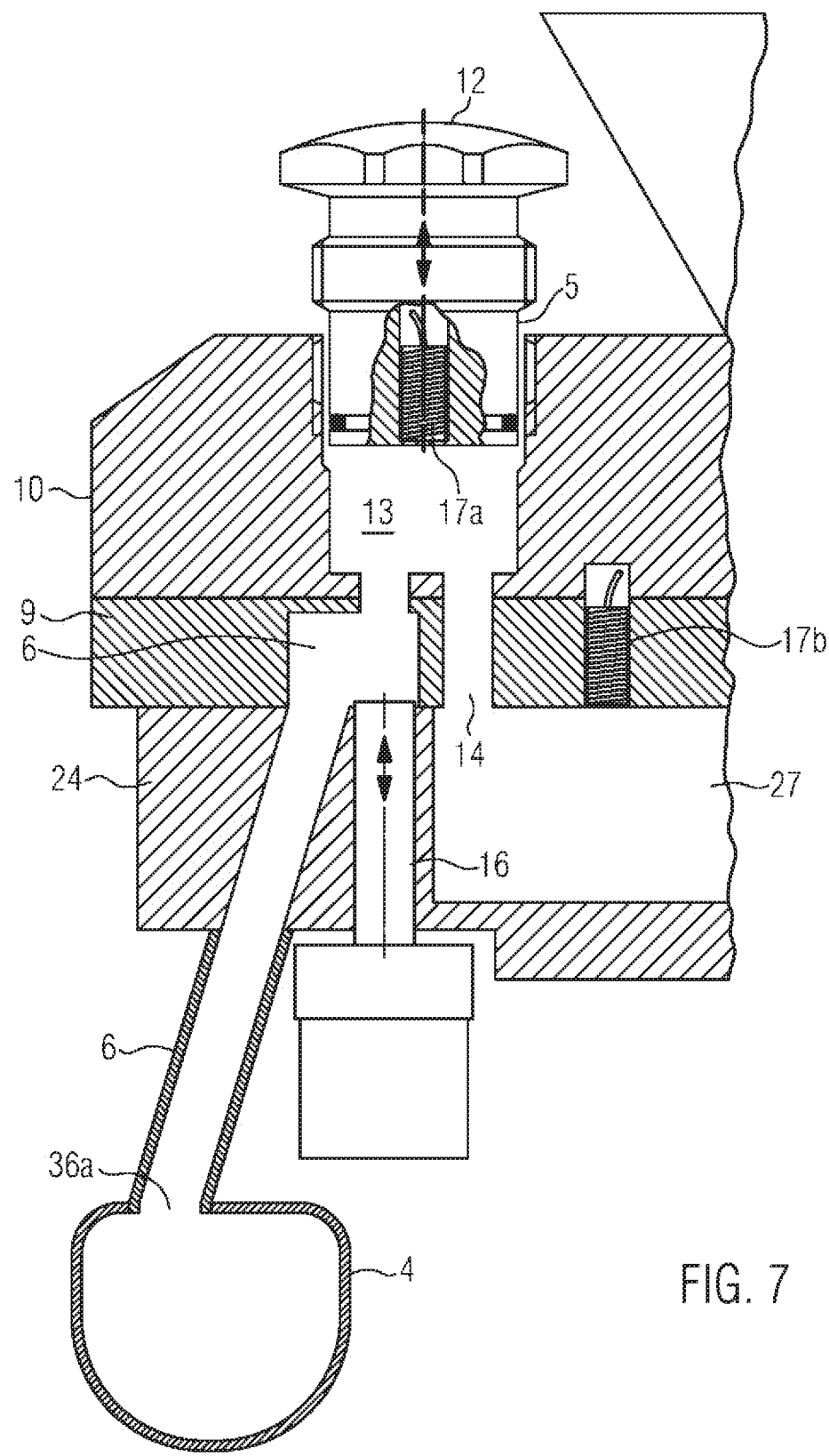
FIG. 7 shows the embodiment shown in FIGS. 5 and 6 with the closure being open in the ventilation position.

FIG. 7 shows the embodiments shown in FIGS. 5 and 6, where closure piston 12 was there moved upwardly and is located in a ventilation position. The closure cylinder there opens the path from channel 6 in the direction toward inspection opening 5.

Figure 8:
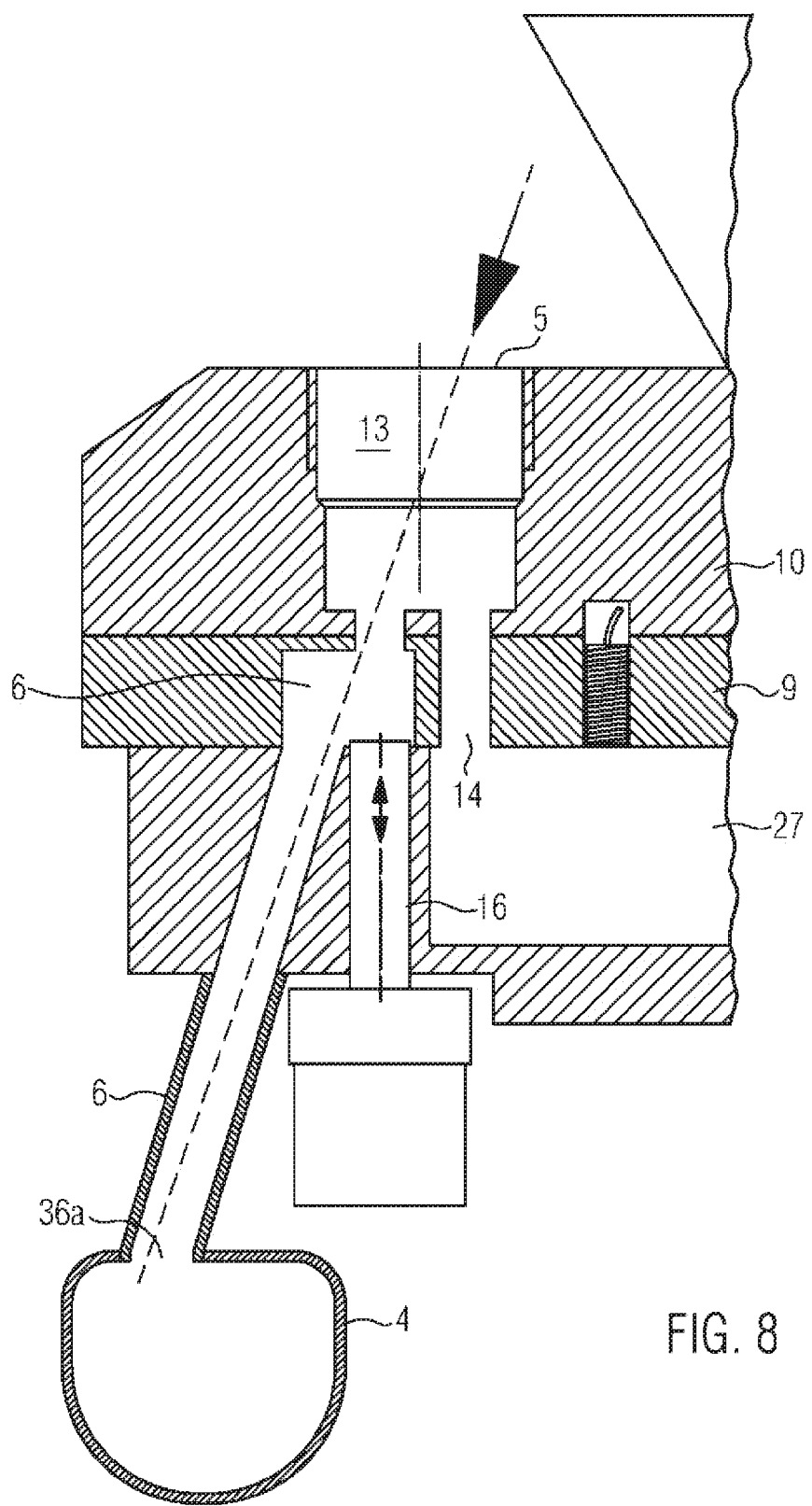
FIG. 8 shows the embodiments shown in FIGS. 5 to 7 with the closure element being removed.

FIG. 8 corresponds to the embodiment shown in FIGS. 5 to 7, where closure piston 12 has there been removed for inspection and cleaning. As is clear from FIG. 8, free inspectability from above from inspection opening 5 through channel 6 to collection container 4 is there given as well.

This means that there is an optical path connecting inspection opening 5 with inlet 36a to collection container 4. The operator can therefore easily recognize whether channel 6 is fouled or clogged and whether collection container 4 is too full.

Figure 9:
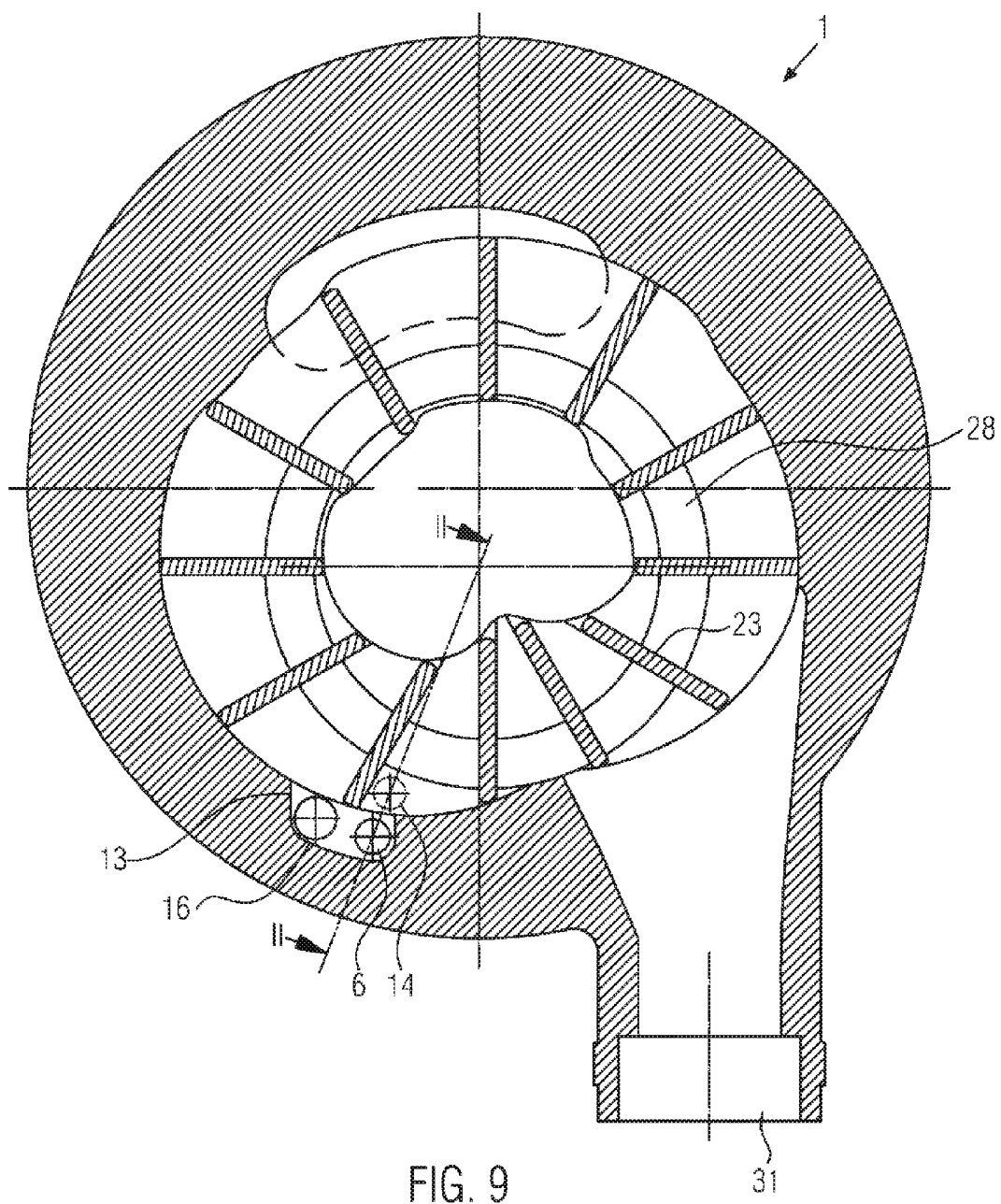
FIG. 9 shows a cross section through a vane cell pump according to the present invention.
Figure 10:
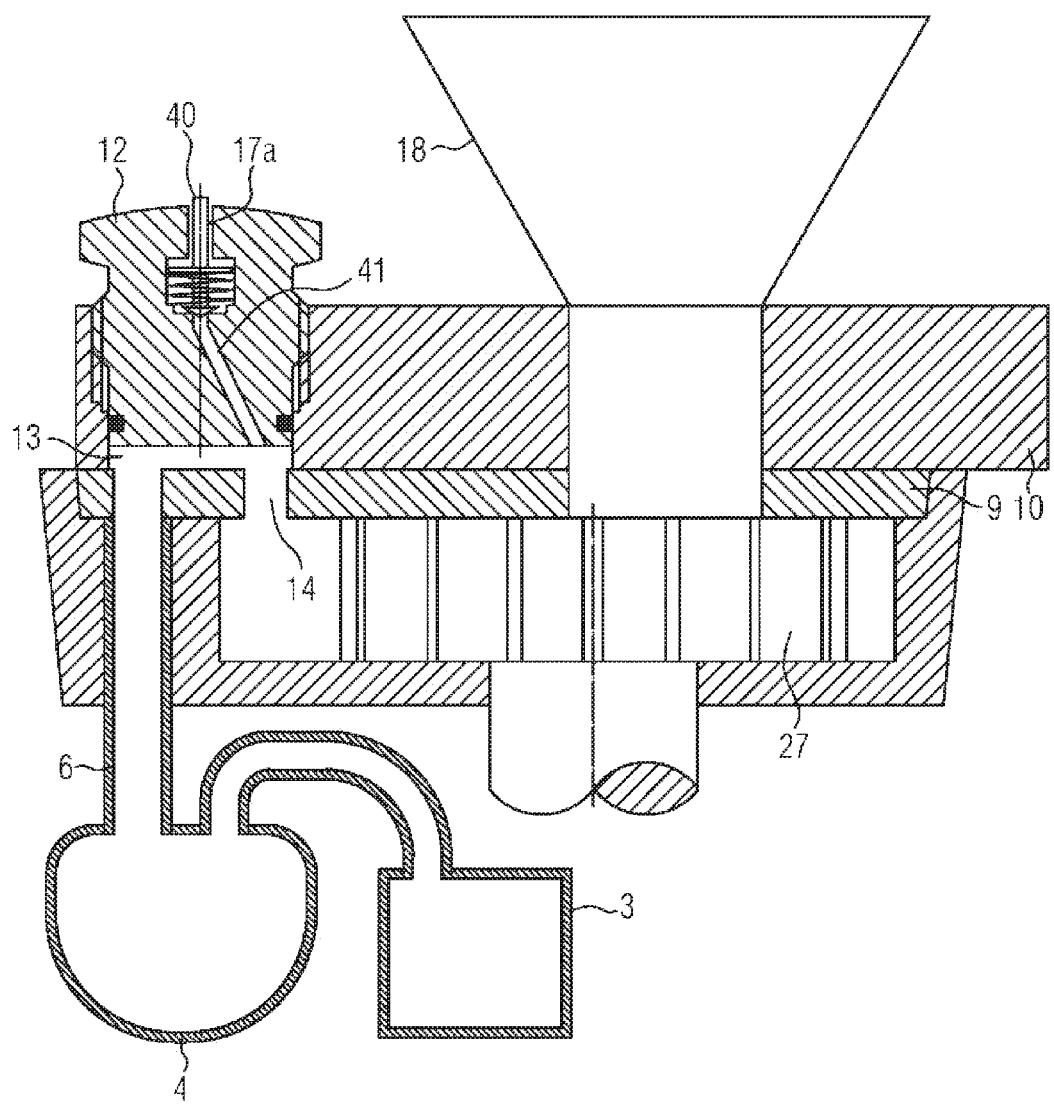
FIG. 10 shows a sectional view along the line II in FIG. 9.

FIG. 9 shows a cross-sectional view through an embodiment according to the present invention. FIG. 10 corresponds to a sectional view taken along line II in FIG. 9. This embodiment corresponds substantially to the previous embodiments, where a slide 40 adjustable in height is provided in closure element 12 as a pressure sensor. Slide 40 is used for visually monitoring the pressure conditions. This slide changes its vertical position in dependence on the pressure in the vacuum region, i.e. in the suction region of the conveying mechanism and in channel 6. Slide 40 is held in a specific position by a preloaded spring (in which the vacuum region is not closed, i.e. channel 41 is in communication with the exterior atmosphere). Sensor 17a is via a line 41 connected to the vacuum system. With negative pressure, slide 40 is drawn into the closure element and is flush with the latter's surface, i.e. closes the vacuum region. When the vacuum being set is reached, then channel 41 is closed. When the pressure increases, the slide is pushed upwardly, similar to the pressure gauge in a pressure cooker, and protrudes upwardly from closure element 12. When the pressure drops, then the slide, possibly marked in e.g. red, exits from the closure element.

One can then via a rise in pressure and an associated change in the position of the slide recognize that possibly channel 6 and/or the collection container are fouled too much.

In the embodiments previously shown, evacuation opening 8 is advantageously integrated into pump cover 9. The principle of free inspectability, however, is also realized when evacuation opening 8 is provided in a side wall 24 of the vane cell pump and a respective channel section 14 being in communication with the evacuation opening opens either directly into channel 6 or e.g. into a recess 13.

Figure 11:
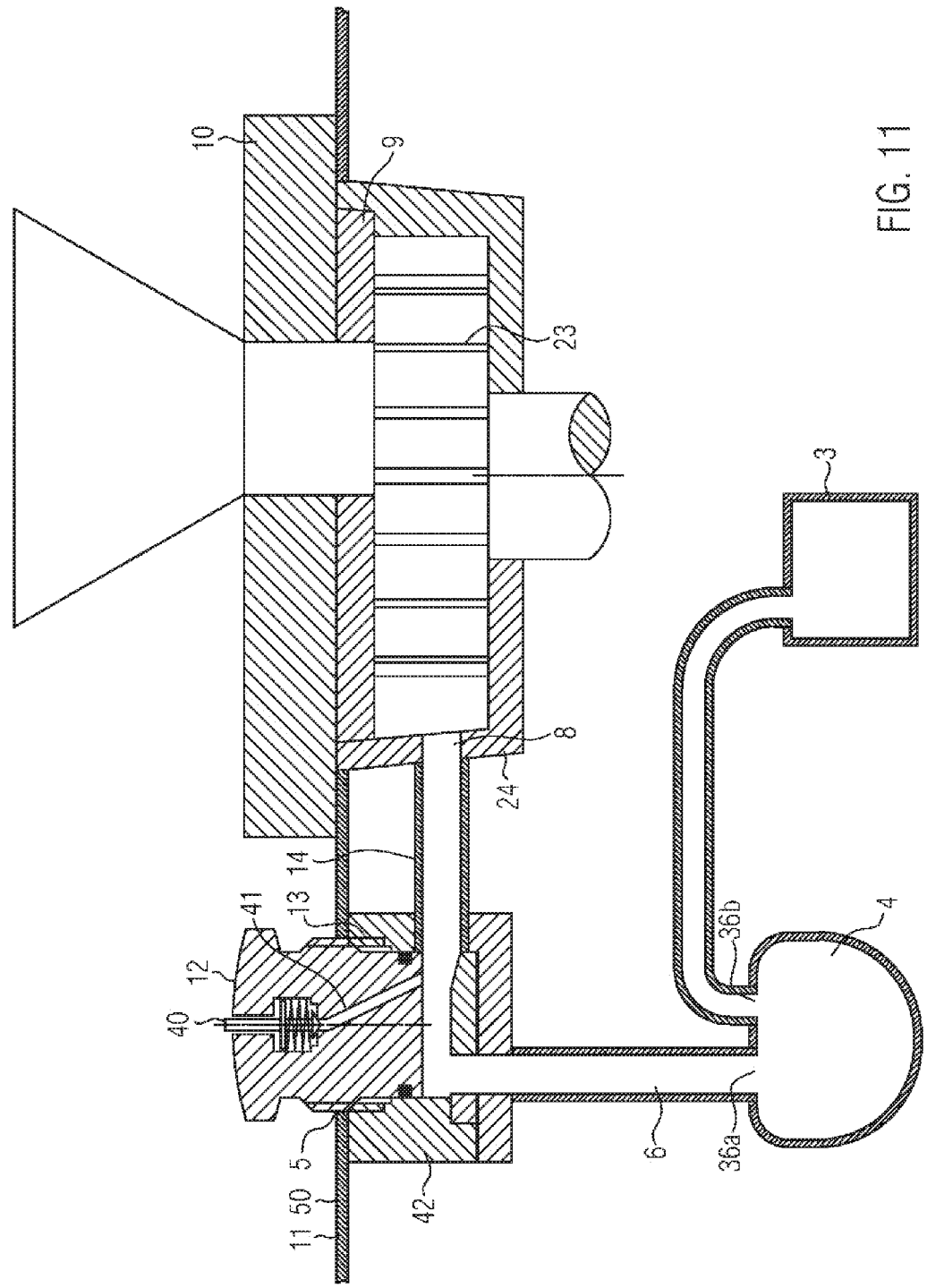
FIG. 11 shows a partial sectional view of a filling machine according to the present invention according to a further embodiment with an inspection opening in the machine frame.

FIG. 11 shows a corresponding arrangement in which evacuation opening 8 is arranged in housing wall 24. Inspection opening 5 is in this embodiment as an additional distinction not positioned in cover 9 or pivot housing 10, but in machine housing 11, i.e. there the upper side or the side wall of machine housing 11. A housing portion 42 is in this embodiment disposed on machine housing 11 on the upper wall of machine housing 11, where recess 13 is there formed in housing portion 42. Here as well, vacuum pump 3 is via collection container 4, channel 6, recess 13, further channel section 14 and evacuation port 8 in communication with the conveying mechanism. As also with the previous embodiments, the vacuum connection between the vacuum pump and the vane cell pump can be separated by piston 12. Although not shown, a separate closure piston 16 can there as well be provided to separate the vacuum path between the vacuum pump and the vane cell pump. Also in this embodiment, channel 6 and collection container 4 can be inspected and easily cleaned when piston 12 is removed.

Figure 12A:
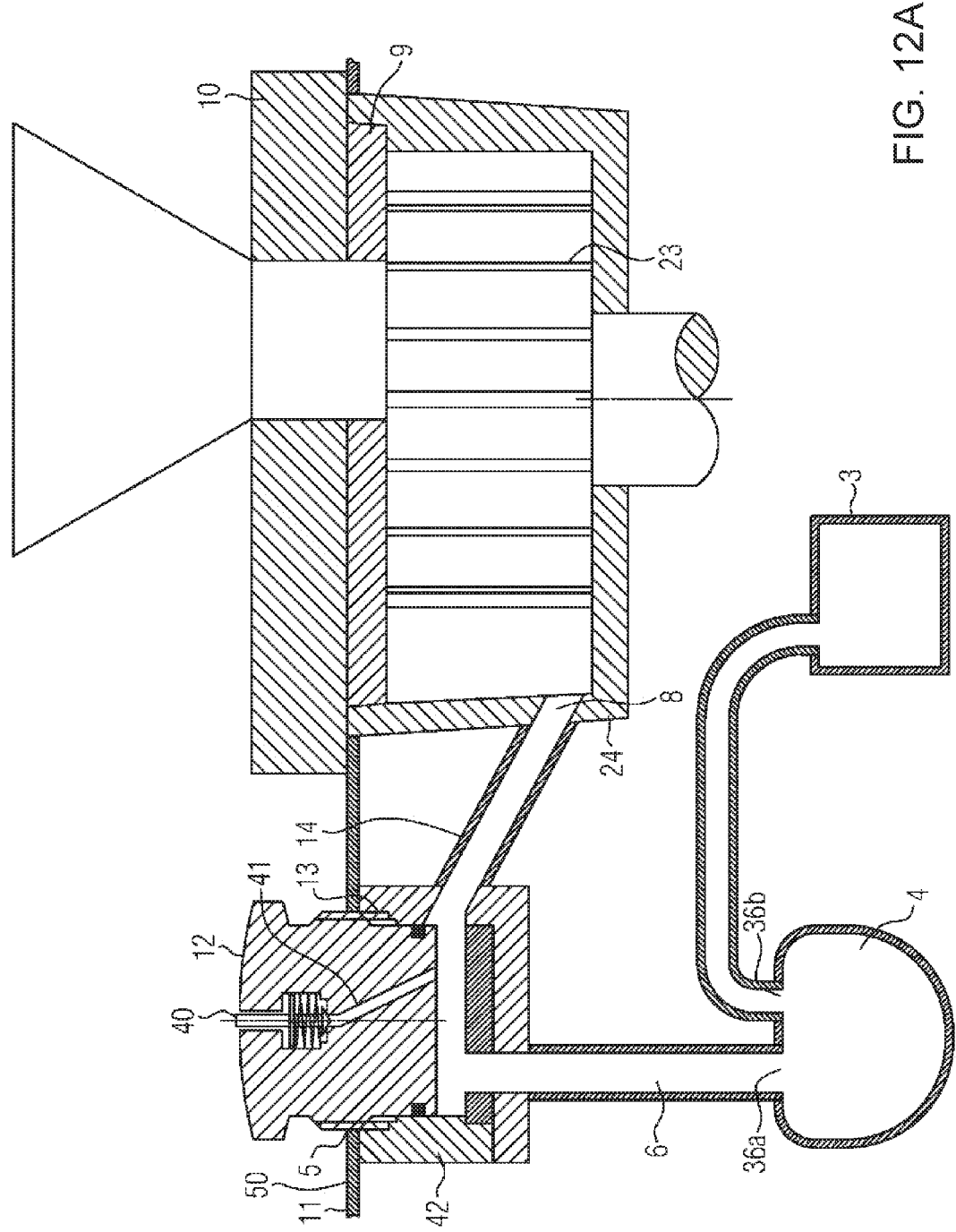
FIG. 12A very schematically shows a further embodiment according to the present invention.

FIG. 12A shows the arrangement shown in FIG. 11 with channel 14 being inclined. In this arrangement, also channel section 14 is still inspectable from above via inspection opening 5. In this embodiment, the inspection opening is located laterally beside vane cell pump 2, like in FIG. 11. Like also in FIG. 11, both channel portion 14 as well as channel 6 and the collection container can be inspected from a position above surface 50 of machine housing 11.

Figure 12B:
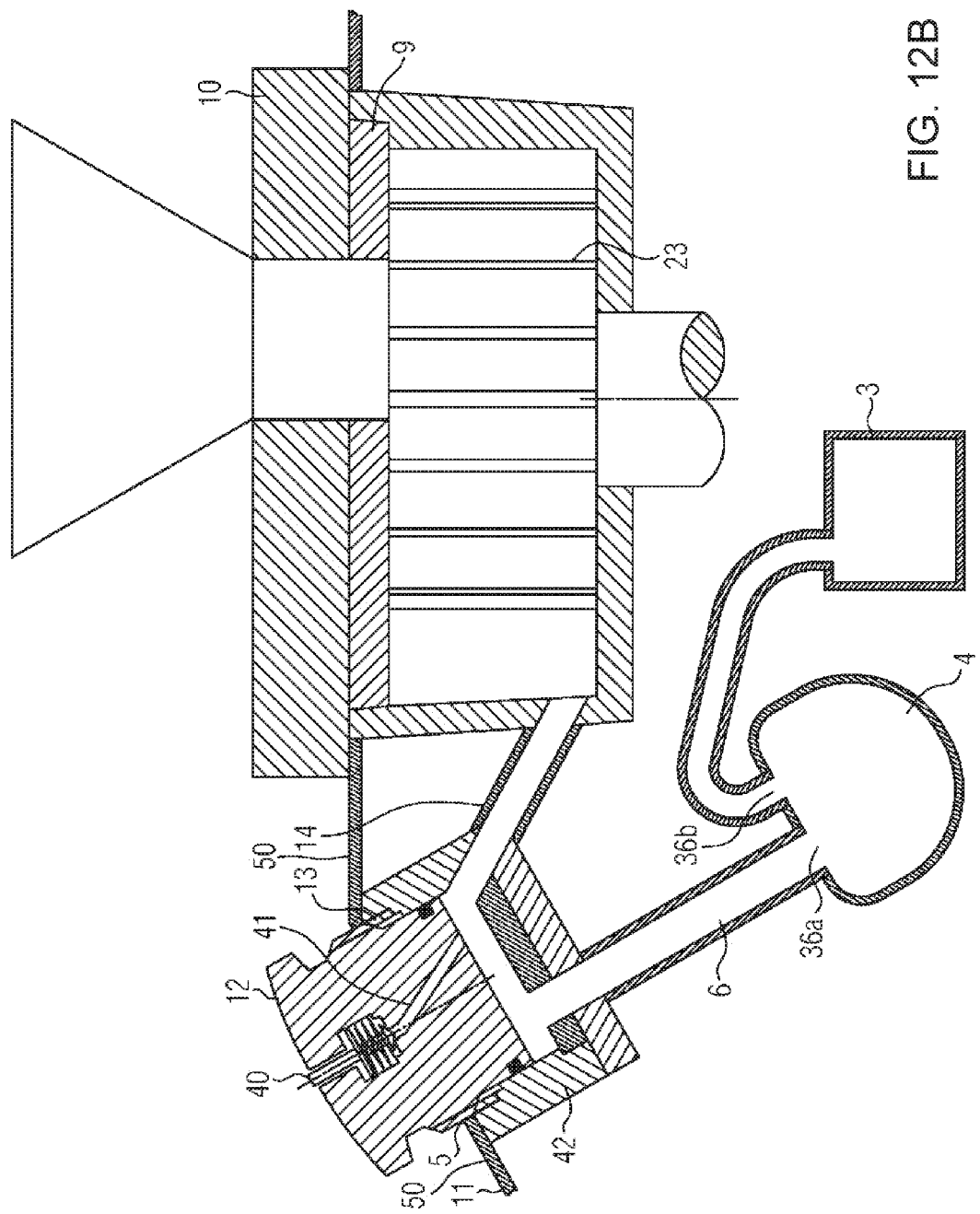
FIG. 12B shows the embodiment shown in FIG. 12A with an inspection opening being inclined.
Figure 13:
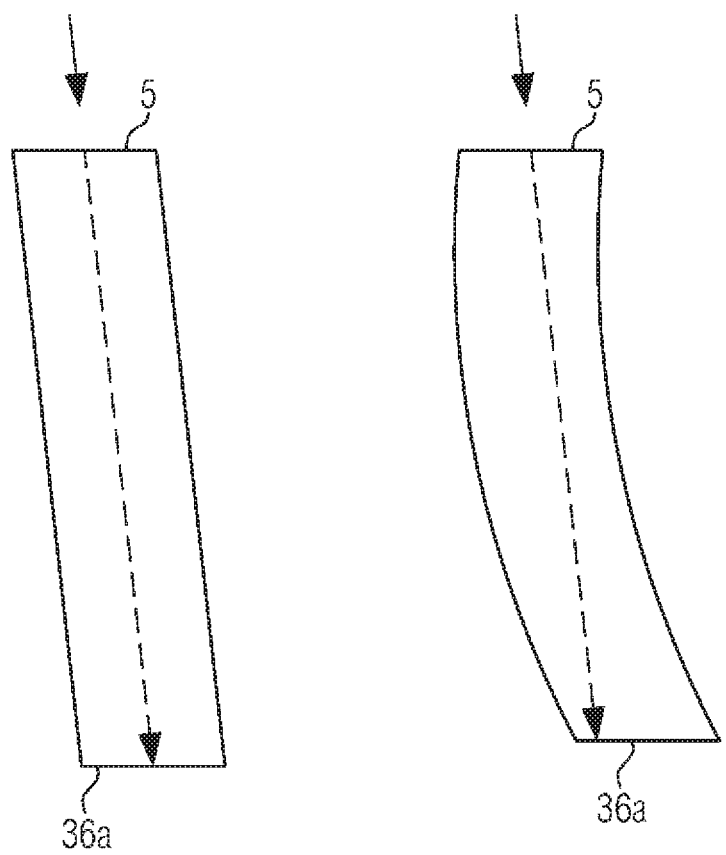
FIG. 13 shows the course of the channel between the collection container and the inspection opening.
Figure 14:
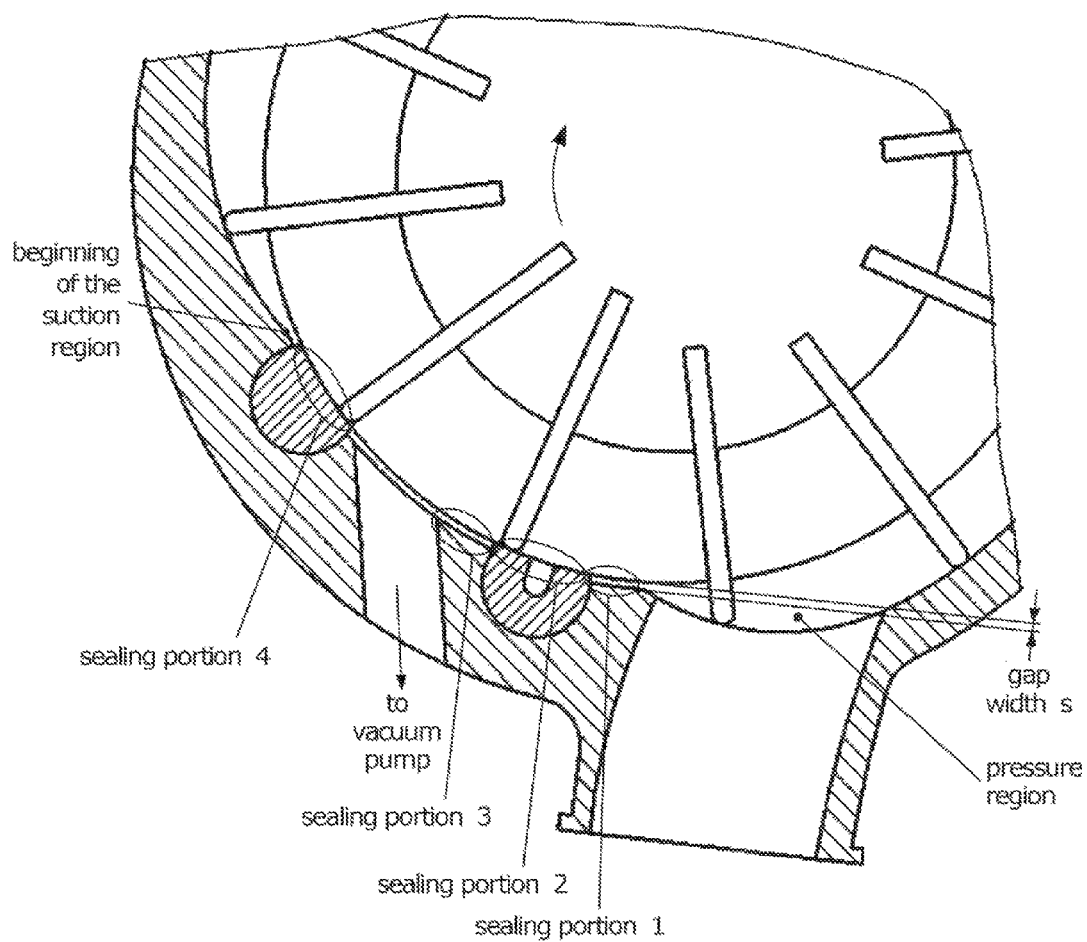
FIG. 14 shows a partial cross-sectional view through a vane cell pump according to prior art.

As is evident from FIG. 12B, it is also possible that the plane in which inspection opening 5 is located is disposed at an angle to the horizontal plane. This also applies for all other embodiments. Here as well, channel portion 14 as well as channel 6 and collection container 4 can be inspected from a position above surface 50 of the machine housing. Due to the inclined position of inspection opening 5 or the surface of the machine housing in this region, respectively, channel section 14 is can be inspected even better. The inspection opening or the plane in which the inspection opening is located, respectively, is inclined, for example, at an angle greater than 0° and less than 45° to the horizontal plane.

The preceding embodiments in connection with FIGS. 5 through 12 have been described with an axially adjustable piston as a closure element. However, it is also possible to close the inspection opening only with an inspection glass. This allows inspecting the channel and/or the collection container during the process or also channel section 14 which leads to evacuation opening 8.

According to the method of the invention, the state of fouling of collection container 4 of the filling machine, but at least channel 6 can be inspected as described above.

FIG. 15 is a flow chart of an example method 1500 for monitoring a state of fouling of a collection container of a filling machine and/or a channel according to the present invention. Method 1500 includes, at step 1502, inspecting said channel and/or said collection container through an inspection opening when said cover of a vane cell pump is closed, wherein said collection container is in communication with said inspection opening via said channel. At step 1504, the method further includes cleaning said channel to said collection container via said inspection opening.

The invention claimed is:

1. A filling machine for a pasty mass for the production of sausages, comprising:
    a vane cell pump for conveying said pasty mass,
    a vacuum pump for generating negative pressure in vane cells of said vane cell pump,
    where said vane cell pump is in communication with said vacuum pump via a collection container for pasty mass that is dragged along, and
    an inspection opening which is via a channel in communication with said collection container for inspecting said channel and/or said collection container,
    wherein there is at least one straight optical path connecting said inspection opening with an inlet to said collection container, and where said channel extends substantially straight.

2. The filling machine according to claim 1, wherein said channel and/or said collection container is freely inspected from a position above an upper side of a machine housing through said inspection opening, where said inspection opening is located in a plane which is inclined by 0° to 45° to a horizontal plane.

3. The filling machine according to claim 2, wherein said inspection opening is located in a plane which is inclined by 0° to 15° to the horizontal plane.

4. The filling machine according to claim 1, wherein said inspection opening is disposed in a cover of said vane cell pump or a pivot housing on which said cover is arranged, or in a machine housing, such that said channel and/or said collection container is inspected through said inspection opening when said cover is closed.

5. The filling machine according to claim 1, wherein said channel extending substantially straight includes said channel extending at an angle of 0° to 45° to a vertical longitudinal axis of said filling machine.

6. The filling machine according to claim 5, wherein said channel extends at an angle of 0° to 5° to the vertical longitudinal axis of said filling machine.

7. The filling machine according to claim 1, wherein said channel is in communication with an evacuation opening in said vane cell pump.

8. The filling machine according to claim 7, wherein said evacuation opening is located in a cover of said vane cell pump.

9. The filling machine according to claim 7, wherein said evacuation opening and/or a channel section being in communication with said evacuation opening is inspected through said inspection opening.

10. The filling machine according to claim 1, wherein said inspection opening is closable with a closure element, and where said closure element is an axially movable piston and/or said closure element comprises an inspection glass.

11. The filling machine according to claim 10, wherein said inspection opening is disposed in an upper region of a recess, where said channel opens in a lower region into said recess, and a further channel section being in communication with an evacuation opening also opens in the lower region into said recess.

12. The filling machine according to claim 11, wherein said axially movable piston is axially movable in said recess and in a lower position separates said channel from said further channel section.

13. The filling machine according to claim 12, wherein said axially movable piston is removable from said recess.

14. The filling machine according to claim 12, wherein said axially movable piston is movable so far upwardly that said channel and said further channel section are vented.

15. The filling machine according to claim 10, wherein a sensor is integrated into said closure element and/or into a cover of said vane cell pump for measuring a temperature and/or a pressure or a filling level, or where said sensor is an optical sensor which optically detects said channel and/or said collection container and illustrates this on a display.

16. The filling machine according to claim 1, wherein said channel is formed at least in sections from transparent material.

17. The filling machine according to claim 16, wherein at least one illumination for illuminating said channel and/or said collection container is provided from the outside.

18. The filling machine according to claim 1, wherein said collection container is formed at least in sections from transparent material.

19. The filling machine according to claim 18, wherein at least one illumination for illuminating said channel and/or said collection container is provided from the outside.

20. The filling machine according to claim 1, wherein said inspection opening is disposed in a side wall of said vane cell pump.

21. The filling machine according to claim 1, wherein a driven closure cylinder is provided which separates a vacuum connection between said vacuum pump and said vane cell pump.

22. A method for monitoring a state of fouling of a collection container of a filling machine and/or a channel, comprising:
    inspecting said channel and/or said collection container through an inspection opening when a cover of a vane cell pump is closed, wherein said collection container is in communication with said inspection opening via said channel, wherein there is at least one straight optical path connecting said inspection opening with an inlet to said collection container, and where said channel extends substantially straight.

23. The method according to claim 22, further comprising cleaning said channel to said collection container via said inspection opening.

24. A filling machine for a pasty mass for the production of sausages, comprising:
   a vane cell pump for conveying said pasty mass,
   a vacuum pump for generating negative pressure in vane cells of said vane cell pump,
   where said vane cell pump is in communication with said vacuum pump via a collection container for pasty mass that is dragged along, and
   an inspection opening which is via a channel in communication with said collection container for inspecting said channel and/or said collection container, wherein said channel is in communication with an evacuation opening in said vane cell pump.

25. A filling machine for a pasty mass for the production of sausages, comprising:
   a vane cell pump for conveying said pasty mass,
   a vacuum pump for generating negative pressure in vane cells of said vane cell pump,
   where said vane cell pump is in communication with said vacuum pump via a collection container for pasty mass that is dragged along, and
   an inspection opening which is via a channel in communication with said collection container for inspecting said channel and/or said collection container, wherein said inspection opening is closable with a closure element, and where said closure element is an axially movable piston and/or said closure element comprises an inspection glass.

26. A filling machine for a pasty mass for the production of sausages, comprising:
   a vane cell pump for conveying said pasty mass,
   a vacuum pump for generating negative pressure in vane cells of said vane cell pump,
   where said vane cell pump is in communication with said vacuum pump via a collection container for pasty mass that is dragged along, and
   an inspection opening which is via a channel in communication with said collection container for inspecting said channel and/or said collection container, wherein said channel is formed at least in sections from transparent material.

27. A filling machine for a pasty mass for the production of sausages, comprising:
   a vane cell pump for conveying said pasty mass,
   a vacuum pump for generating negative pressure in vane cells of said vane cell pump,
   where said vane cell pump is in communication with said vacuum pump via a collection container for pasty mass that is dragged along, and
   an inspection opening which is via a channel in communication with said collection container for inspecting said channel and/or said collection container, wherein said collection container is formed at least in sections from transparent material, and wherein at least one illumination for illuminating said channel and/or said collection container is provided from the outside.

28. A filling machine for a pasty mass for the production of sausages, comprising:
   a vane cell pump for conveying said pasty mass,
   a vacuum pump for generating negative pressure in vane cells of said vane cell pump,
   where said vane cell pump is in communication with said vacuum pump via a collection container for pasty mass that is dragged along, and
   an inspection opening which is via a channel in communication with said collection container for inspecting said channel and/or said collection container, wherein said inspection opening is disposed in a side wall of said vane cell pump.

29. A filling machine for a pasty mass for the production of sausages, comprising:
   a vane cell pump for conveying said pasty mass,
   a vacuum pump for generating negative pressure in vane cells of said vane cell pump,
   where said vane cell pump is in communication with said vacuum pump via a collection container for pasty mass that is dragged along, and
   an inspection opening which is via a channel in communication with said collection container for inspecting said channel and/or said collection container, wherein a driven closure cylinder is provided which separates a vacuum connection between said vacuum pump and said vane cell pump.

* * * * *